United States Patent [19]

Friedman

[11] Patent Number: 4,579,721
[45] Date of Patent: Apr. 1, 1986

[54] PROCESS FOR RECOVERING METALS FROM WASTE

[75] Inventor: Robert H. Friedman, Houston, Tex.
[73] Assignee: Getty Oil Company, Houston, Tex.
[21] Appl. No.: 637,304
[22] Filed: Aug. 3, 1984
[51] Int. Cl.$^4$ .................... C01G 31/00; C01G 53/00; C01G 49/00
[52] U.S. Cl. ........................................ 423/66; 423/68; 423/140; 423/150
[58] Field of Search .................. 423/66, 140, 68, 150; 75/108

[56] References Cited
U.S. PATENT DOCUMENTS

| 913,709 | 3/1909 | Dow et al. | |
|---|---|---|---|
| 2,842,436 | 7/1958 | Dasher et al. | 75/101 |
| 3,000,727 | 9/1961 | Matson | 75/108 |
| 3,203,786 | 8/1965 | Wesolowski et al. | 75/82 |
| 3,224,874 | 12/1965 | Daugherty | 75/108 |
| 3,549,321 | 12/1970 | Everett | 23/200 |
| 3,752,759 | 8/1973 | Burg et al. | 423/66 |
| 3,790,658 | 2/1974 | Fox et al. | 423/15 |
| 3,800,024 | 3/1974 | Forsell et al. | 75/108 |
| 3,876,747 | 4/1975 | Pittie et al. | 75/108 |
| 3,929,599 | 12/1975 | Johnson et al. | 204/108 |
| 3,975,495 | 8/1976 | Bowerman | 423/55 |

Primary Examiner—H. T. Carter
Attorney, Agent, or Firm—Arnold, White & Durkee

[57] ABSTRACT

Metals such as nickel and vanadium can be recovered from scrubber waste by first lowering the pH of the waste to a level at which its major metal constituents will be substantially solubilized, and then raising the pH in increments to successively precipitate the metals it contains.

10 Claims, 3 Drawing Figures

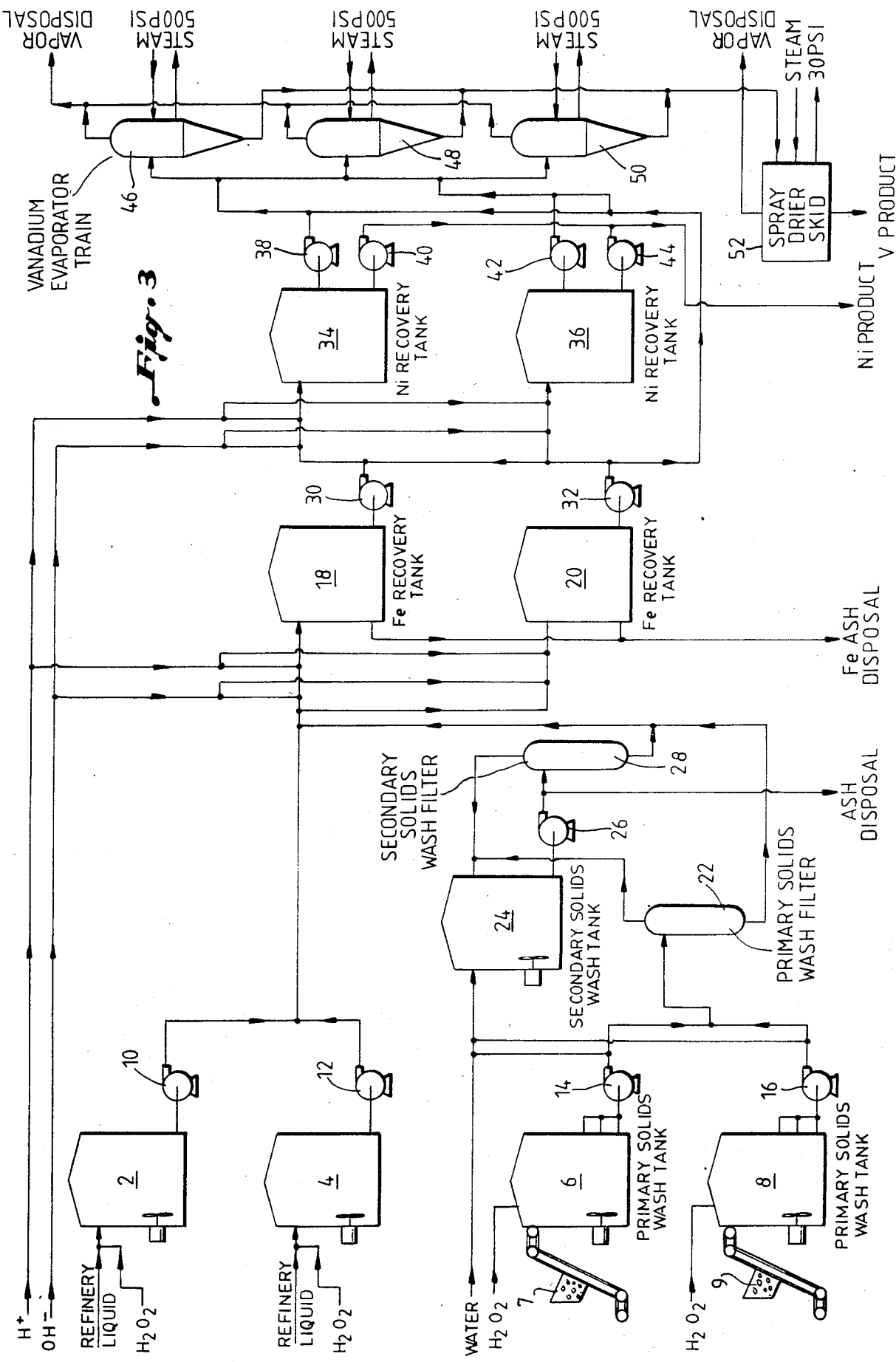

PROCESS FOR RECOVERING METALS FROM WASTE

BACKGROUND OF THE INVENTION

The present invention concerns a process of removing metals from waste. One embodiment of the process specifically involves recovery of nickel and vanadium from scrubber waste.

Many industries produce waste which contains metals. Some of these metals are toxic, and therefore the waste containing them can be hazardous to store. One specific example is cogeneration plants which burn coal or coke to product steam and electricity. Such plants often include stack gas scrubber units which produce metal-containing waste. Scrubber units are also used in oil refineries and chemical plants.

Reducing the metal content of such waste would not only have environmental benefits, but could also be profitable, since metals such as nickel and vanadium have significant value.

Processes presently exist for removing metals from such waste using solvent extraction. However, waste treatment plants using solvent extraction processes tend to be relatively expensive. An improved process that could efficiently remove metals from scrubber waste, or at least significantly reduce their concentration, would have substantial economic and environmental benefits.

SUMMARY OF THE INVENTION

A process for recovering major metal constituents from waste in accordance with the present invention includes the steps of: (a) adjusting the pH of the waste to a level effective to substantially solubilize the major metal constituents; (b) raising the pH of the waste to a level high enough to precipitate a major metal constituent; (c) separating out the precipitate from step (b); and (d) repeating steps (b) and (c) at least once on the waste remaining to recover at least one major metal constituent which precipitates at a higher pH than the pH prevailing at the first precipitation. This process of separation by pH control is based on the tendency of more acidic metals to precipitate at lower pHs than less acidic metals. For metals that can have different valence states, precipitation will largely occur at a different pH for each state.

"Major metal constituents" is used in this patent to mean metal components of scrubber waste which are present in large enough quantities to make their recovery economically and technically feasible. In general, major metal constituents will be present in the waste at concentrations at least on the order of several hundred ppm, and often 1,000 ppm or more. Any specific metal could be present in its elemental state, as a single compound, or in a mixture of different compounds in the waste.

Waste from stack gas scrubbers frequently contains substantial amounts of iron, nickel, and vanadium, the latter two of which are relatively valuable metals.

One embodiment of the present invention which is directed specifically to the recovery of nickel and vanadium includes the steps of (a) filtering the waste; (b) adding a basic material to the filtrate produced by step (a) to raise its pH to about 11, causing a precipitate containing iron, vanadium, and nickel to form; (c) dissolving the iron-vanadium-nickel precipitate in acid to form an acidic solution having a pH less than about 3; (d) adding a basic material to the solution to raise its pH to about 3, causing a first iron-rich precipitate to form; (e) separating out the first iron-rich precipitate from the remaining liquid; (f) adding a basic material to the remaining liquid from step (e) to raise its pH to about 6, causing a first vanadium rich precipitate to form; (g) separating out the first vanadium rich precipitate from the remaining liquid; (h) adding a basic material to the remaining liquid from step (g) to raise its pH to about 10, causing a first nickel-rich precipitate to form; and (i) separating out the first nickel-rich precipitate from the remaining liquid. In this embodiment only vanadium in the +4 oxidation state will be recovered, but that will usually be the majority of vanadium present in the waste. When dealing with typical scrubber waste, this embodiment of the present invention should be able to recover about 86% of the total vanadium present at a purity of about 97.4% and about 88% of the total nickel in the waste at a purity of nearly 100%. Both metals are recovered in the form of solid hydroxides. The VO-$(OH)_2$ can be converted into other vanadium compounds using methods known to one skilled in the art.

Each precipitate formed will be impure, usually containing a relatively large quantity of one of the metals along with minor amounts of the others. The purity can be improved by redissolving the precipitate in acid and then reprecipitating it by adding a basic material. This redissolving and reprecipitation can be repeated any desired number of times for each precipitate.

A second embodiment of the present invention directed specifically to the recovery of nickel and vanadium includes the steps of: (a) lowering the pH of the waste to about 0.5 to 3.0; (b) raising the pH of the waste to about 4.0 to 5.0, causing an iron-rich precipitate to form; (c) separating out the iron-rich precipitate from the waste; (d) raising the pH of the waste to about 8.0 to 10.0, causing a nickel-rich precipitate to form; (e) separating out the nickel-rich precipitate from the waste; and (f) recovering vanadium from the remaining waste. This second embodiment can achieve a higher degree of nickel and vanadium recovery than the previously-described embodiment, but is also more expensive, primarily because of its use of oxidant, as described below.

The lowest pH cut in this embodiment removes the iron in the form of a precipitated salt, which is discarded. The second cut contains the nickel, and the remainder includes the vanadium. Each cut is impure, containing a larger quantity of the principal metal plus minor amounts of the other two. If the impure precipitate is redissolved and reprecipitated, the purity of the principal metal can be increased. This procedure can be repeated one or more times to achieve any desired degree of purity of the nickel and vanadium. The presently preferred procedure for this embodiment is to redissolve and reprecipitate the iron cut once and the nickel cut twice.

Step (a) of the second embodiment is preferably achieved by adding an agent to the waste which will oxidize the vanadium as well as lowering the pH, instead of merely doing the latter. While merely lowering the pH with an acid will permit recovery of about 25% of the vanadium present, using an oxidizing agent such as hydrogen peroxide dramatically increases vanadium recovery. This is because vanadium occurs in several valence states, and the lower ones are not very soluble in acidic solutions. Therefore, in this embodiment, all the vanadium in the waste is preferably oxidized to its +5 valence state before precipitation. Nickel always has a +2 valence in solution, so it needs no treatment.

This second embodiment of the process of the present invention should usually be able to separate out about 95% of the vanadium present in scrubber waste at a purity in excess of 97% and nearly 100% of the nickel at a purity of about 87%.

Processes in accordance with the present invention have substantial environmental benefits because of their ability to reduce the metal content of scrubber waste. Waste from which metals such as nickel and vanadium have been removed, wholly or partially, is significantly less hazardous to store than in its untreated state. Furthermore, the recovered metals can be a profitable product themselves. A metals recovery plant using a process in accordance with the present invention is expected to have far lower capital and operating costs than a plant using a solvent extraction process. The first embodiment described above is believed to have especially good economic advantages, because it avoids or reduces the cost of the oxidizing agent.

In addition, vanadium is presently considered a strategic metal in this country. Processes which permit recovery of vanadium from material that has been treated as waste in the past would lessen our dependence on foreign souces of vanadium.

BRIEF DESCRIPTION OF THE DRAWINGS

FIG. 3 is a flow diagram showing the arrangement of equipment that might be used in the second process in accordance with the present invention.

DETAILED DESCRIPTION OF SPECIFIC EMBODIMENTS

The following is a more detailed explanation of the first embodiment of the present invention which was described in the Summary of Invention. This embodiment is less expensive than the second embodiment described, partly because the use of a large quantity of oxidant is eliminated, but it also recovers less of the vanadium and nickel present in the waste.

The purpose of using an oxidizing agent is to put all the vanadium in the waste in the same valence state. Since the different valence states precipitate at different pHs, making all the vanadium the same valence permits precipitation of it at a single pH.

In order to analyze the problem of the cost of the oxidizing agent, tests were done to determine what percentage of the vanadium in scrubber waste was in the +3, +4, and +5 valence states. Specifically, the output of a stack gas scrubber unit was being stored in a pond, and the waste in that pond was analyzed. The +3, +4, and +5 states existed in a ratio of 3:28:1, or in percentage terms, 9:88:3. Since the great bulk of the vanadium was in the +4 state, a fairly high degree of vanadium recovery could be achieved by recovering only that fraction without any vanadium oxidation.

In this embodiment of the present invention, the general approach is to precipitate the nickel, iron, and +4 vanadium from the waste in one step, and then return the unprecipitated liquid to the pond, storage tank, or whatever receptacle is used for the output of the scrubber unit. After further processing of the precipitate, the vanadium and nickel can be sold as solid hydroxides, or further processed to obtain metals in a more pure state.

In this first embodiment it appears desirable to filter the water from the scrubber before it is dumped into the pond. The solids removed by this filtration are mostly hydrocarbons, and can be burned.

Also, it is preferable to take the feed for the metals recovery unit from the pond rather than directly from the scrubber output. The liquid produced by the stack gas scrubber might typically contain about 400 ppm iron, while the liquid in the pond might contain only 200 ppm. This is because oxidation is occurring constantly in the pond, converting ferrous iron to ferric, which will precipitate at the 4.5 pH that typically prevails in the pond. This minimizes the amount of the undesirable iron that must be separated out from the other metals with further processing.

Several attempts were made (see examples 4–9) to increase the vanadium recovery by oxidizing all the vanadium to +4 oxidation state through the addition of ferric ions. It appears, however, that attempting to reduce the +5 to +4 inevitably results in some reduction to +3, and every attempt to oxidize +3 to +4 will always produce some +5. Therefore, it seems preferable merely to recover +4 vanadium.

Figure 1:
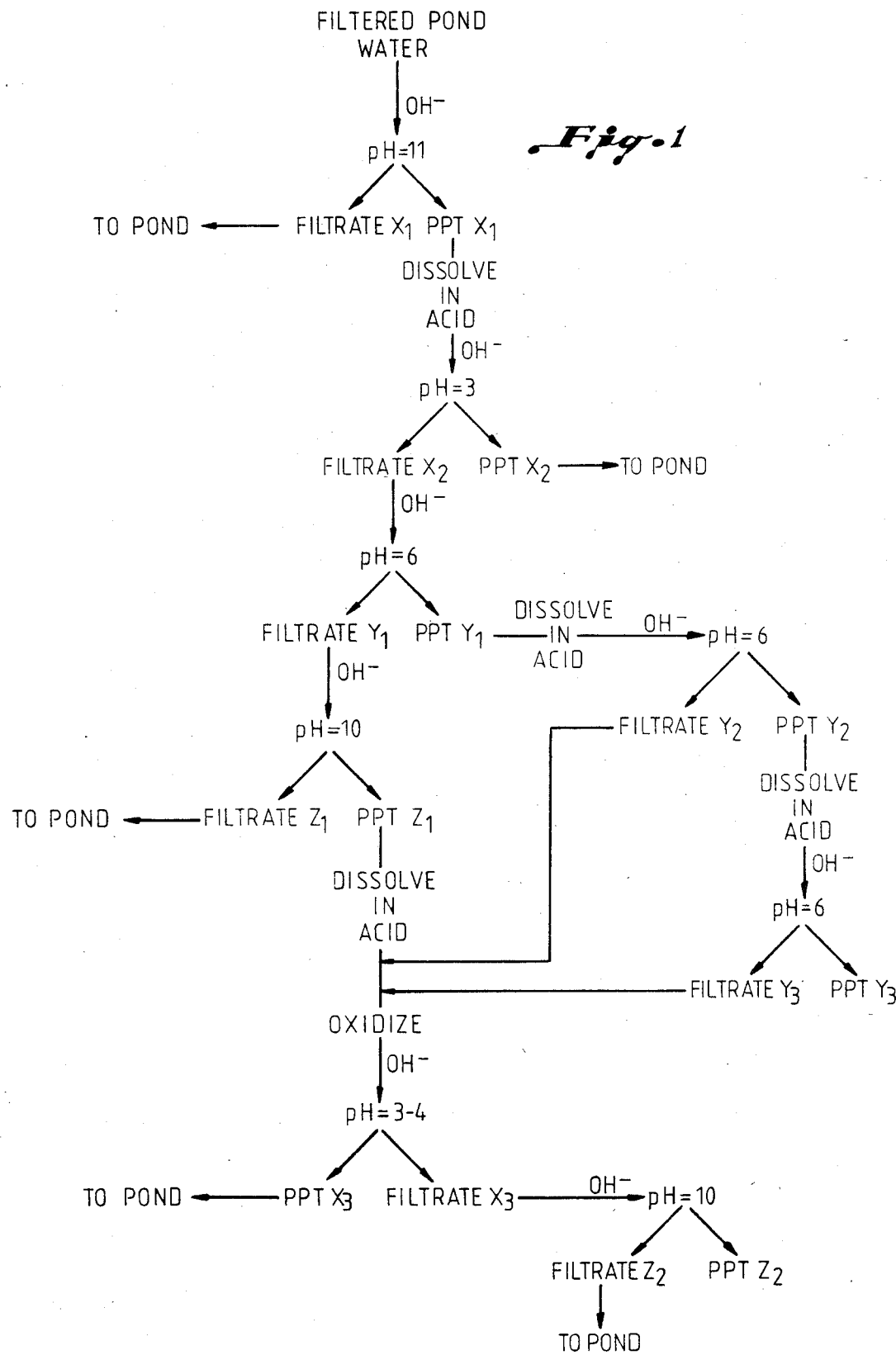
FIG. 1 shows a flow diagram for a first process in accordance with the present invention.

FIG. 1 graphically shows a sequence of steps for implementing the first embodiment of the present invention. The procedure shown in FIG. 1 and described below can be truncated if a lower quality separation is desired, or expanded for even greater purification.

The first step shown, precipitating the heavy metals from the filtered pond water, is the most critical. In this step, the metals are separated from the large quantity of sulfate salts that are present in the scrubber waste. Raising the pH to 11 in this step can be accomplished by adding basic materials such as lime or sodium or potassium hydroxide. Lime has the disadvantage of forming calcium sulfate precipitates, which will occlude much of the vanadium and nickel, thereby reducing the yields of the desired products. Alkali metal hydroxides are therefore preferred, and sodium hydroxide seems to be cheapest.

(In the description below, X is used to designate precipitates rich in iron, while Y and Z indicate vanadium-rich and nickel-rich precipitates, respectively. The only exception is PPT $X_1$, which contains substantial amounts of all three metals.)

The processing begins by filtering water from the pond in which the scrubber waste is stored. The pH of the filtered pond water is raised to 11 by adding a basic material, which causes a precipitate to form which contains essentially all the iron and nickel present in the filtered water, and also contains about 86% of vanadium from the water. The solution is filtered, and the filtrate (FILTRATE $X_1$) is returned to the pond. The precipitate (PPT $X_1$) is dissolved in 1N HCl, having a volume about 5% of that of the filtered water used in the first step. Some of the sulfate salts in the precipitate will often not be solubilized by the acid. Such salts can be washed, which will produce a sodium sulfate precipitate containing a trace of vanadium. This precipitate can be returned to the pond.

The remaining acidic solution then has its pH raised to about 3 by addition of a basic material. A precipitate forms at this point which contains primarily iron (PPT $X_2$). This precipitate should be returned to the pond after filtration. The filtrate (FILTRATE $X_2$) has its pH raised to about 6 by the addition of a basic material.

Another precipitate forms at this point (PPT $Y_1$) which will contain essentially all of the +4 vanadium, 74.5% of the nickel available, and 47.2% of the iron available. Eighty-two percent of this precipitate will be made up of vanadium. After filtration, the filtrate (FILTRATE $Y_1$) has added to it a basic material to raise its pH to about 10, causing another precipitation. This precipitate (PPTE$_1$) will contain essentially only nickel and ferrous iron, with 84.8% by weight of the precipitate being nickel. This represents 25.5% of all the nickel that was available for recovery. After filtration, the filtrate (FILTRATE $Z_1$) is returned to the pond.

PPT $Y_1$ is dissolved in dilute hydrochloric acid, and then the pH of the resulting acidic solution is raised to 6 by adding a basic material. The precipitate formed (PPT $Y_2$), is then redissolved in acid and reprecipitated at pH 6. The resulting precipitate (PPT $Y_3$) is 97.4% vanadium, 2.4% nickel, and 0.2% iron. This vanadium content represents 100% of the +4 vanadium that was available for recovery.

PPT $Z_1$ is dissolved in acid, and then it is mixed with FILTRATE $Y_2$ and FILTRATE $Y_3$. This mixture is then oxidized by adding hydrogen peroxide, which converts all of the ferrous iron to ferric iron. A basic material is then added to raise the pH to about 3 to 4, which will cause all the ferric iron to precipitate (PPT $X_3$), this precipitate to be returned to the pond. The filtrate from this step (FILTRATE $X_3$) has a basic material added to it to raise its pH to about 10. The precipitate formed at this point (PPT $Z_2$) is a nearly pure nickel hydroxide, representing 88% of the nickel that was available for recovery in the pond water. The nickel not recovered in PPT $Z_2$ is lost in PPT $X_3$ and PPT $Y_3$.

The preceding is a description of one specific sequence of steps for implementing this first embodiment of the present invention. As one skilled in the art can see, this embodiment generally revolves around precipitating all the heavy metals in the filtered pond water initially, and then subsequently precipitating iron at a pH of about 3, the +4 vanadium at a pH of about 6, and the nickel at a pH of about 10.

If only the metals were present in the pond water, calculations show that 99% of the +4 vanadium should be precipitated, at a pH of 4.3. Actual experiments show that a pH of 6 is required, due to the 13% total dissolved solids (TDS) in the pond water. If the TDS is 17%, as it might be after a lime treatment of the pond, a pH of 10 is necessary to get the same result. Therefore, the pH chosen to precipitate most of the vanadium and nickel must work regardless of the TDS level.

Since the pH scale is logarithmic, each unit increase or decrease in pH from 7 uses ten times as much as or base, and costs correspondingly more. However, this cost only becomes prohibitive at pHs above 12 and below 3.

The precipitates produced by this embodiment of the present invention will be metal hydroxides, and they can either be sold as is or further refined.

One general goal of metal recovery from scrubber waste is to remove all of the heavy metals so that the remaining water can be easily disposed of. Since this embodiment of the present invention will not remove all the metals, it will not fully achieve that goal, but by substantially reducing the metals content, it makes the remaining waste significantly less hazardous to store.

The following examples relate to various steps in the preceeding embodiment.

EXAMPLE 1

The output of a stack gas scrubber was piped to a storage pond. Samples of the pond water and of the output from the scrubber were taken and analyzed by atomic absorption (AA). The concentrations of vanadium, nickel, and iron are shown in ppm in Table 1.

TABLE 1

|  | V | Ni | Fe |
|---|---|---|---|
| Pond | 1600 | 600 | 100 |
| Scrubber Output | 1700 | 650 | 400 |

EXAMPLE 2

Three samples of water from the pond were raised to pHs of 12, 13, and 14 by adding a basic material. The samples were then allowed to stand for one hour, during which time a precipitate formed. The samples were then centrifuged and decanted, and the fluid was analyzed for vanadium by AA analysis. Twelve appeared to be the optimal pH (of the three tested) for vanadium recovery, leaving approximately 200 ppm of vanadium in the fluid.

EXAMPLE 3

This experiment was done to determine the valence of the vanadium remaining in the fluid after the initial precipitation. A sample of pond water had its pH raised to 9.5, and one hour was allowed for precipitation. The sample was then centrifuged and decanted, and the decanted fluid was divided into two aliquots. An excess of ferric iron, an oxidizing agent, was added to the first, and an excess of phosphite, a reducing agent, was added to the second. The pH of both samples was then raised to 9.5, and another hour was allowed for precipitation. The samples were centrifuged and decanted, and the decanted fluid was analyzed for vanadium by AA. The sample to which ferric iron had been added contained 50 ppm vanadium, while the sample to which phosphite had been added contained 150 ppm.

EXAMPLE 4

Ferric ions were added to three samples of pond water so that the concentration of those ions was 400, 500 and 600 ppm. The pH of each sample was raised to 9.5, one hour was allowed for precipitation, and then the samples were centrifuged and decanted Analysis of the decanted fluids with AA is shown in Table 2.

TABLE 2

| Fe (ppm) | V (ppm) |
|---|---|
| 400 | 540 |
| 500 | 770 |
| 600 | 790 |

EXAMPLE 5

The pH of a sample of pond water was raised to 9.5, one hour was allowed for precipitation, and the sample was then centrifuged and decanted. The decanted liquid was divided into two aliquots, and an excess of ferric ion was added to the first and an excess of phosphite was added to the second. The pH of each aliquot was raised to 9.5, and another hour was allowed for precipitation. The samples were then centrifuged and decanted. An excess of phosphite ions was added to the aliquot that had previously been treated with ferric ions, and vice versa. The pH of each aliquot was then raised once again to 9.5, and another hour was allowed for precipitation, followed by a centrifuging and decanting. The decanted fluids were analyzed with AA. The fluid which had first been treated with ferric ions and then with phosphite ions contained 25 ppm vanadium, while the liquid that had been treated in the opposite order contained 70 ppm vanadium.

EXAMPLE 6

A sample of washed output of a scrubber unit had its pH raised to 9.5, one hour was allowed for precipitation, and the sample was then centrifuged, decanted, and analyzed with AA. Its metals content was 200 ppm vanadium, 24 ppm nickel and 8 ppm iron.

EXAMPLE 7

This experiment involves underoxidation. A sample of the scrubber units output had added to it 100 ppm of ferric ion, and the pH of this sample was raised to 9.5. After one hour for precipitation, the sample was centrifuged, decanted, and tested for vanadium using AA. It contained 122 ppm vanadium.

EXAMPLE 8

A sample of the output of a scrubber unit had its pH raised to 9.5, and after one hour for precipitation, was centrifuged and decanted The decanted fluid was oxidized by adding ferric ions to reach a concentration of 300 ppm. Next, the pH was raised to 9.5 and one hour was allowed for precipitation, followed by centrifuging and decanting. The decanted fluid was analyzed, and then phosphite was added. Next, the pH was raised to 9.5, and after one hour, the sample was centrifuged and decanted. The decanted fluid was once again analyzed, and then ferric ion was added to the fluid. The pH was raised to 9.5, one hour was allowed for precipitation, and the sample was centrifuged and decanted. This decanted fluid was also analyzed with AA. The analysis showed that the decanted fluid from the first oxidation contained 30 ppm vanadium, the decanted fluid from the reduction contained 19 ppm vanadium, and the fluid from the second oxidation contained 12 ppm vanadium.

EXAMPLE 9

The pH of a sample of a scrubber unit's output was raised to 9.5, and after one hour of precipitation it was centrifuged and decanted. Phosphite was added to the decanted liquid, and enough sodium cloride was added to the liquid to create a sodium chloride concentration of 1 M. The pH was then raised to 9.5. After one hour, the sample was centrifuge and decanted. AA analysis showed that 64 ppm of vanadium were in the decanted fluid.

EXAMPLE 10

A 10 g sample of liquid from the pond was evaporated. The weight of the residue was 1.3 g, giving an idea of the total dissolved solids typically contained in the liquid.

EXAMPLE 11

A water wash was used to adjust the pH of a sample of scrubber output to 9.5. One hour was allowed for precipitation. An attempt was made to filter the sample, but this failed due to particle size, so the sample was instead centrifuged and decanted The solids were water washed, and the water wash was analyzed with AA. The analysis revealed that very little of the metals in the solids dissolved into the washing water.

EXAMPLE 12

The pH of a sample of scrubber output was raised to 7 and one hour was allowed for precipitation. All the solids contained in this sample were able to pass through a filter at this point. The pH of a second sample was raised to 5, and an hour was allowed for precipitation, followed by a filtration. The filtrate from this second sample contained over 90% of vanadium which the sample originally contained.

EXAMPLE 13

A sample of scrubber output had its pH raised to 6, and one hour was allowed for precipitation. The sample was then filtered and water washed. The solids were then redissolved and this solution and the filtrate were analyzed using AA. The results are shown in Table 3.

TABLE 3

|  | V (ppm) | Ni (ppm) | Fe (ppm) |
|---|---|---|---|
| Solid | 1500 | 200 | 80 |
| Filtrate | 200 | 420 | 300 |

Beginning with Example 14, a new sample of pond water was used which had been treated in a pond with lime. The pH of this sample was 6.5, compared to the 4.0 pH of the previous pond water samples.

EXAMPLE 14

A 10 g sample of this pond liquid was evaporated, leaving a residue of 1.7 g, giving some indication of the total dissolved solids in the liquid.

EXAMPLE 15

A sample of the pond water was analyzed with AA, indicating that it contained 2100 ppm vanadium, 370 ppm nickel, and 185 ppm iron.

EXAMPLE 16

This experiment was done to determine the effect of sodium sulfate on the solubility of the metals. A sample of pond water was saturated with sodium sulfate, and then the pH of the sample was raised to 10. A second sample of pond water had its pH raised to 10, and then both samples were centrifuged and decanted. Analysis of the decanted fluids is shown in Table 4.

TABLE 4

|  | V (ppm) | Ni (ppm) | Fe (ppm) |
|---|---|---|---|
| Saturated | 648 | 18 | 1.23 |
| Unsaturated | 500 | 21 | 1.13 |

EXAMPLE 17

A sample of the sodium sulfate saturated pond water had its pH raised to 11. A second saturated sample had its pH raised to 12. Both samples were centrifuged and decanted and then analyzed using AA. Both samples contained 650 ppm of vanadium.

EXAMPLE 18

A sample of pond water had its pH raised to 11, followed by centrifuging and decanting. AA analysis showed that the decanted fluid contained 300 ppm vanadium.

EXAMPLE 19

The solid from experiment 18 was water washed, and then the water wash was analyzed using AA. It was found to contain 116 ppm vanadium, 0.56 ppm nickel, and 0.15 ppm iron.

Example 20

Samples of pond water had added to them enough calcium hydroxide to make the solutions 1.5, 0.15, and 0.015M. Each solution was then centrifuged and decanted, and then analyzed for vanadium. The fluid from the 1.5M solution contained 41 ppm vanadium, while the liquid from the 0.15M and 0.015M samples contained 207 and 1973 ppm vanadium, respectively.

EXAMPLE 21

Aliquots were taken from the 1.5M and 0.15M samples in Experiment 20. Analysis for total dissolved solids indicated that the former had 11.6% while the latter had 13.7%.

EXAMPLE 22

A two liter sample of pond water had added to it enough calcium hydroxide to make a 0.15M solution. One hour was allowed for precipitation, followed by filtration. The filtrate was analyzed for vanadium, and 180 ppm was found. The precipitate was redissolved in 100 ml of dilute sulfuric acid (approximately 5% of the original volume). This solution was filtered to separate out the undissolved calcium sulfate. The calcium sulfate was then water washed, and the filtrate, water wash, and remaining calcium sulfate were analyzed for vanadium. They were found to contain 25%, 25%, and 50%, respectively, of the vanadium in the beginning sample.

EXAMPLE 23

The pH of a 2 liter sample of pond water was raised to 11 using potassium hydroxide. After allowing one hour for equilibration, the sample was filtered and the filtrate was analyzed for vanadium. Three hundred ppm were found.

The precipitate was redissolved in 100 ml of dilute sulfuric acid, and the undissolved sulfate was filtered out. The sulfate was analyzed for vanadium, but none was found. The pH of the filtrate was then raised to 2, followed b filtration. The pH of the filtrate was then raised to 6, followed by another filtration. The pH of the remaining filtrate was then raised to 10, followed by yet another filtration. The remaining filtrate and the three precipitates were analyzed using AA, and the results were shown in Table 5 below.

TABLE 5

|  | % of Total Metal | | | % Composition of ppt | | |
|---|---|---|---|---|---|---|
|  | V | Ni | Fe | V | Ni | Fe |
| ppt Fe (pH 2) | — | — | 43.7 | — | — | 100.1 |
| ppt V (pH 6) | 100 | 74.5 | 47.2 | 82 | 13.6 | 4.1 |
| ppt Ni (pH 10) | — | 25.5 | 9.1 | — | 84.8 | 15.2 |
| Filtrate | — | — | — |  |  |  |

EXAMPLE 24

The precipitate formed at pH 6 in Example 23 was dissolved in dilute hydrochloric acid. The pH of the sample was then raised to 6, and one hour was allowed for precipitation with rapid stirring throughout this period. The sample was then filtered, and both the precipitate and filtrate were analyzed. The results are shown in Table 6.

TABLE 6

|  | % of Total Metal | | | % Composition | | |
|---|---|---|---|---|---|---|
|  | V | Ni | Fe | V | Ni | Fe |
| ppt | 100 | 44.1 | 98.9 | 89.2 | 6.5 | 4.3 |
| filtrate | — | 55.9 | 1.1 | — | 99.3 | 0.7 |

EXAMPLE 25

The precipitate from Example 24 was once again dissolved in dilute hydrochloric acid. The pH was raised to 6, followed by one hour of stirring. The sample was then filtered, and the precipitate and filtrate were analyzed using AA. The results are shown in Table 7.

TABLE 7

|  | % of Total Metal | | | % Composition | | |
|---|---|---|---|---|---|---|
|  | V | Ni | Fe | V | Ni | Fe |
| ppt | 100 | 33.3 | 95.3 | 93.5 | 2.3 | 4.2 |
| filtrate | — | 66.7 | 4.7 | — | 95.5 | 4.5 |

EXAMPLE 26

The precipitate from Example 25 was dissolved in dilute hydrochloric acid, and then the pH was raised to 3 by adding a basic material followed by stirring for one hour to permit precipitation. The sample was then filtered, and the precipitate and filtrate were analyzed using AA. The results are shown in Table 8.

TABLE 8

|  | % of Total Metal | | | % Composition | | |
|---|---|---|---|---|---|---|
|  | V | Ni | Fe | V | Ni | Fe |
| ppt | — | — | 95.1 | 97.4 | 2.4 | 4.3 |
| filtrate | 100 | 100 | 4.9 | — | — | 100.0 |

EXAMPLE 27

The nickel rich precipitate formed at pH 10 in Experiment 23 was combined with the filtrates from Examples 24 and 25. This mixture was oxidized with hydrogen peroxide, and then its pH was raised to 4. One hour was allowed for precipitation, with rapid stirring during the entire hour. The sample was then filtered, and the precipitate and filtrate were analyzed using AA. The results are shown in Table 9.

TABLE 9

|  | % of Total Metal | | % Composition | |
|---|---|---|---|---|
|  | Ni | Fe | Ni | Fe |
| ppt | 1.6 | 100 | 19.7 | 80.3 |
| filtrate | 98.4 | — | 100.0 | — |

The following discussion and examples pertain to the second embodiment referred to in the Summary of Invention.

Three samples of scrubber waste were examined by nuclear activation analysis. The analysis showed that vanadium, nickel, and iron were present in significant quantities. The concentration of each metal is shown in Table 10.

TABLE 10

| Element | Petroleum Fluid Coke | Boiler Residues | Effluent Gas Slurry |
|---|---|---|---|
| As | .55 | 91 | 5 |
| Br | .9 | <6 | <8 |
| Ce | 1.1 | 100 | 4.7 |
| Co | 7.4 | 690 | 12.3 |
| Cr | 1.6 | 1040 | 25.8 |
| Eu | <.02 | .28 | <.03 |
| Fe(%) | .015 | 2.08 | .04 |
| Hf | <.1 | 1.2 | <.1 |
| La | .99 | 105 | 4.0 |
| Na(%) | .007 | .85 | 11.5 |
| Sb | .17 | 8.2 | 1.3 |
| Sc | .01 | 1.57 | .03 |
| Se | <1 | <5 | 1.4 |
| Sm | .06 | 6.6 | .3 |
| Ta | <.1 | .5 | <.1 |
| Tb | <.1 | .3 | <.1 |
| Th | <.1 | 2.6 | <.1 |
| V | 2300 | 10200 | 4900 |
| Zn | 4.4 | 360 | 9.5 |
| Ni | 500 | 82500 | 1500 |

(ppm unless otherwise indicated)

Although sodium was present in fairly high concentrations in these samples, its presence does not cause the environmental problems that many of the heavy metals do, and further, sodium is not as amenable to recovery by pH control. Alkaline metals such as sodium are generally not included in the term "major metal constituents" as it is used in this patent.

Other samples were taken of liquid and solid waste both from the output of a scrubber unit and from a pit where the output was being stored. Atomic absorption (A.A.) analysis was performed on each sample. The results for the liquid samples are shown in Table 11.

TABLE 11

| | ppm | | |
|---|---|---|---|
| | Fe | Ni | V |
| Pit | 105 | 610 | 1620 |
| Day 1 | 100 | 585 | 1580 |
| Day 2 | 98 | 565 | 1595 |
| Day 3 | 100 | 605 | 1595 |

The solid samples were acid extracted and then analyzed by A.A. The results are given in Table 12.

TABLE 12

| | ppm | | |
|---|---|---|---|
| | Fe | Ni | V |
| Pit | 210 | 905 | 3050 |
| Day 1 | 210 | 900 | 3063 |
| Day 2a | 209 | 910 | 3053 |
| Day 2b | 213 | 915 | 3047 |

As the tables show, it appeared that the daily variation in metals content of the waste was very small, and that the composition of the waste in the pit was nearly the same as that in the output stream.

EXAMPLE 28

One hundred grams of acid solutions having pHs ranging from 1.0 to 4.5 in 0.5 increments were added to 25 gram samples of solid waste. The samples were allowed to extract overnight, and were then filtered and washed. The filtrates were diluted and analyzed for vanadium and nickel by A.A. Essentially 100% of the total nickel present in the original samples, 1500 ppm, was present in each filtrate increment. The greatest amount of vanadium, 4700 ppm, was found in the filtrate from the sample where the pH was 1.0. Since the total recoverable vanadium in the original sample was 18,600 ppm, this represented only 25.3% recovery. The recoveries in the filtrates as a percentage of the maximum possible are shown in Table 13.

TABLE 13

| pH | V % | Ni % |
|---|---|---|
| 1.0 | 25.3 | 100 |
| 1.5 | 11.3 | 100 |
| 2.0 | 11.3 | 100 |
| 2.5 | 8.1 | 100 |
| 3.0 | 8.1 | 100 |
| 3.5 | 8.1 | 100 |
| 4.0 | 8.1 | 100 |
| 4.5 | 5.9 | 100 |

EXAMPLE 29

As mentioned above, the vanadium in the waste is preferably oxidized to its +5 state before precipitation in this second embodiment. The oxidation can be performed either on the solid waste before extraction or on a solution obtained by acid extraction of the solid. However, Example 28 shows that the latter procedure leaves an excessive amount of vanadium in the solid waste.

Therefore, in this experiment, an excess amount of 40% hydrogen peroxide (100 g) was added to a 25 g sample of solid waste. The materials were mixed and approximately 3 hours was allowed for reaction. The sample was then filtered, washed, and analyzed using A.A.

Essentially 100% of the vanadium available in the original solid sample (18,600 ppm) was found to be in the filtrate.

EXAMPLE 30

This experiment was performed only on a liquid waste sample. In the actual practice of processes in accordance with this second embodiment of the present invention, the solution obtained from the solids portion as in Example 29 would preferably be combined with the liquid waste, and they would then be treated further together.

Initial A.A. analysis of the liquid sample indicated that it contained 1600 ppm vanadium, 600 ppm nickel, and 100 ppm iron. The solution pH was 5 before oxidation with hydrogen peroxide and 1.5 afterward.

The pH of the sample was raised to 3.5 with potassium hydroxide, and a precipitate was produced. This precipitate was filtered out. The pH of the remaining liquid was then increased in 0.5 increments, and the precipitate formed at each level was filtered, until a final pH of 9.5 was reached. Aliquots from the filtrate at each pH increment were diluted and analyzed by A.A.

The iron virtually all dropped out by pH 4.5 and the nickel all dropped out between the 8 and 9.5 pH levels. The vanadium however, dropped out over the entire pH range. For this reason, a split/resplit experiment was performed. It indicated that the initial pH cuts should be made at 4.5 and 9.5.

EXAMPLE 31

Figure 2:
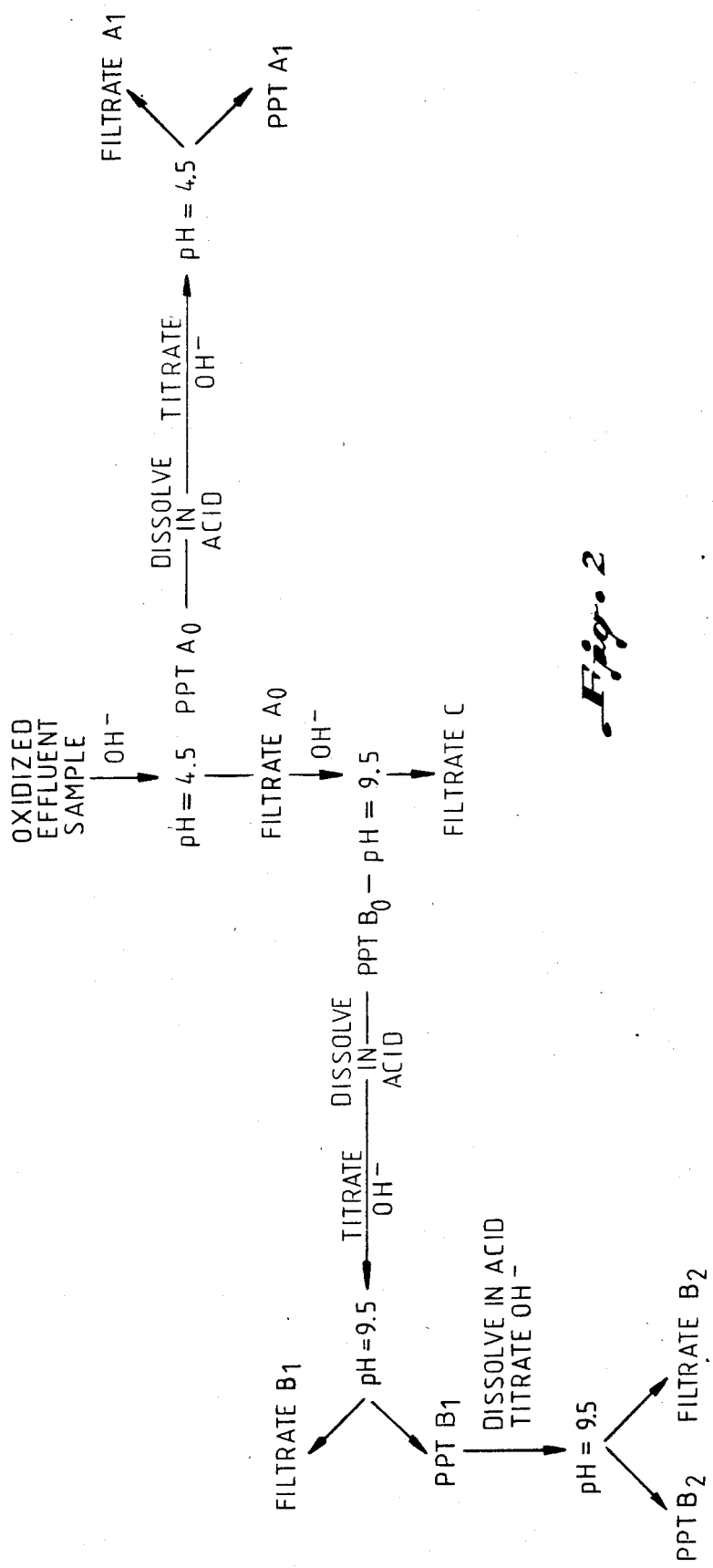
FIG. 2 shows a flow diagram for a second process in accordance with the present invention.

The separation strategy described below is shown as a flow chart in FIG. 2. The pH of an oxidized sample was raised to 4.5 and the sample was then filtered. The filtrate was labeled FILTRATE $A_0$. The precipitate (PPT $A_0$) was dissolved in hydrochloric acid and brought back to pH 4.5 by the addition of ammonium hydroxide, and then filtered. The precipitate was labeled PPT $A_1$ and the filtrate was labeled FILTRATE $A_1$. Both were analyzed by A.A.

The pH of FILTRATE $A_0$ was raised from 4.5 to 9.5, and the precipitate formed was filtered. The resulting filtrate was labeled FILTRATE C and analyzed by A.A. The precipitate formed at 9.5 (PPT $B_0$) was redissolved in hydrochloric acid, brought back up to pH 9.5 and then filtered. The filtrate was labeled FILTRATE $B_1$ and the precipitate was labeled PPT $B_1$. Both were analyzed by A.A. PPT $B_1$ was redissolved in acid and the pH of the resulting solution was raised to 9.5. The sample was then filtered. The filtrate was labeled FILTRATE $B_2$ and the precipitate was labeled PPT $B_2$.

The results of the A.A. analysis are listed in Table 14.

TABLE 14

|  | Fe ppm (%) | Ni ppm (%) | V ppm (%) |
|---|---|---|---|
| PPT $A_0$ | 100 (100) | 0(0) | 148.8 (9.5) |
| PPT $A_1$ | 100 (100) | 0(0) | 0(0) |
| FILTRATE $A_1$ | 0(0) | 0(0) | 148.8 (9.5) |
| PPT $B_0$ | 0(0) | 600 (100) | 266.4 (15.5) |
| PPT $B_1$ | 0(0) | 600 (100) | 176.6 (10.0) |
| PPT $B_2$ | 0(0) | 600 (100) | 88.0 (5.0) |
| FILTRATE $B_1$ | 0(0) | 0(0) | 88.8 (5.5) |
| FILTRATE $B_2$ | 0(0) | 0(0) | 88.0 (5.0) |
| FILTRATE C | 0(0) | 0(0) | 1184.0 (75.0) |

As Table 14 shows, the resplit at pH 4.5 cleanly eliminated the iron (see PPT $A_1$) while recovering 9.5% of the total vanadium (see FILTRATE $A_1$). The resplits at pH 9.5 picked up an additional 10.5% of the total vanadium (see FILTRATE $B_1$ and FILTRATE $B_2$). However, 5.0% of the vanadium remained in the nickel cut (PPT $B_2$).

Every filtrate shown in Table 14 contains vanadium but is free of nickel and iron. The total vanadium content of the filtrates ($A_1$, $B_1$, $B_2$, and C) is 95% of the total vanadium potentially recoverable. The other 5% is in PPT $B_2$. This precipitate could be resplit to increase vanadium yield, but such further resplits would increase the cost while yielding diminishing returns.

EXAMPLE 32

A further attempt was made to recover the vanadium from the products of Example 31. The precipitate formed at pH 9.5 was dissolved in acid and its pH was raised to 9.0 instead of 9.5. A.A. analysis showed results identical to those obtained in Example 31.

The equipment for implementing a process in accordance with the second embodiment of the present invention can take the form shown in FIG. 3. This particular arrangement will recover vanadium in the form of vanadium pentoxide. Processing as shown in FIG. 3 is performed on a batch basis with a 3 hour cycle time per batch.

Tanks 2, 4, 6, and 8 treat the incoming raw materials. Tanks 2 and 4 are used to condition the incoming refinery liquid stream (which might contain 0.2% vanadium) while tanks 6 and 8 treat the incoming solids (which might include 3% vanadium). (Note that in this second embodiment, both the solid and liquid portions of the waste are preferably treated, while in the first embodiment the solids are preferably filtered out at the outset and only the liquid waste is treated. One of the two liquid tanks, 2 or 4, and one of the two solids tanks, 6 or 8, will be used at any one time with the other tank on standby. As the batch cycle is completed, the tank on standby is placed in service. The tank in service is emptied and placed on standby, and the cycle repeats itself.

Incoming refinery liquid waste is treated with hydrogen peroxide before entering the tank 2 or 4 to oxide the vanadium to its +5 state. The pH of the resulting liquid will be approximately 1.5. The oxidation step lasts approximately 3 hours, and at the end of this time, the contents of tank 2 or 4 are transferred by pump 10 or 12 to tank 18 or tank 20 for iron removal.

Solids are charged into tank 6 or tank 8 by bucket conveyors 7 and 9. Hydrogen peroxide is added to the solids in tank 6 or 8 to solubilize the material and oxidize the vanadium to its +5 state. It is believed that other oxidizing agents than hydrogen peroxide could be used. Examples of agents that might be useful are the peroxy compounds, permanganates, such as potassium permanganate, elemental chlorine, hypochlorous acid and its salts, sodium chlorite, chlorine dioxide, chloric acid and its salts, halogenated compounds such as periodic acid, and metal oxides.

The 3 hour oxidizing and settling cycle follows, in which the precipitate is allowed to settle. The liquid phase is then pumped through a primary solids wash filter 22 to the iron recovery tank 18 or 20. The solid waste is pumped to a tank 24 for a water wash before disposal. After the water and solids have separated in the tank 24, the water is pumped by a pump 26 through a secondary solids wash filter 28 to the iron recovery tank 18 or 20. The solid phase is pumped out of the tank 24 for disposal.

The pH in the tank 18 or 20 is adjusted with a base to approximately 4.5. A sludge containing mostly iron with a trace of vanadium will precipitate. After phase separation, the liquid is transferred by a pump 30 or 32 to a tank 34 or 36 for the nickel/vanadium separation. The sludge remaining in the tank 18 or 20 is dissolved with acid to decrease its pH to approximately 1.5. A base is then added until the solution's pH is approximately 4.5. An iron-containing sludge precipitates while the recovered vanadium remains in solution. After a phase separation, the liquid is pumped to the evaporator train where it is combined with the vanadium stream leaving the nickel/vanadium separation tank 34 or 36. The solids from the tank 18 or 20 are pumped out for disposal.

The pH in the tank 34 or 36 is initially 4.5, and is adjusted with a base to approximately 9.5. A nickel and vanadium-containing solid is precipitated. The liquid is pumped by a pump 38 or 42 out to the vanadium evaporator train. The precipitate is redissolved with an acid by lowering the pH of the solution to approximately 1.5. A base is again added to the solution until the pH is approximately 9.5. A nickel/vanadium precipitate is reformed that is richer in nickel than the previous precipitate. The liquid is pumped out to the evaporator train while the solids remain in the tank 34 or 36. The pH in the tank is once again adjusted to 1.5 with an acid, then raised to 9.5 with a base. The liquid is pumped out to the evaporator train while the remaining slurry, which might for example contain approximately 87% nickel and 13% vanadium, is sent to product storage using a pump 40 or 44.

The evaporator train receives feed from the nickel recovery tank 34 or 36 and the iron recovery tank 18 or 20. Solution water is evaporated in the evaporators 46, 48, and 50 until the liquor concentration becomes about one pound of vanadium pentoxide for each 125 pounds of water. The concentrated vanadium pentoxide solution that is left is then pumped from the evaporator train to the spray drier 52 for drying. Solid vanadium pentoxide from the drier 52 can be bagged or sent to storage.

If the incoming solid waste contains about 3% vanadium and the waste liquid contains about 0.2% vanadium, this second embodiment of the present invention should be able to yield a 97 to 98% pure solid vanadium pentoxide product. If the input flow rates are 160,000 pounds per day of solids and 249 gpm of liquid waste, about 4,800 pounds per day of vanadium pentoxide could be produced.

The preceding description has been intended to illustrate processes in accordance with the present invention, and not to list every possible embodiment of the present invention. Those skilled in the art will recognize that many modifications and substitutions could be made.

I claim:

1. A process for recovering nickel and vanadium from waste which also contains iron, including the steps of:
   (a) removing any solids present in the waste;
   (b) increasing the pH of the liquid waste remaining after step (a) to a level high enough to cause the iron, nickel, and vanadium having a +4 valence to precipitate;
   (c) dissolving the iron-vanadium-nickel precipitate in an acidic solution; and
   (d) adjusting the pH of the solution in increments to selectively precipitate the metals, with iron, vanadium, and nickel-rich precipitates being formed at pH's of about 3, 6, and 10, respectively.

2. A process for recovering nickel and vanadium from waste which also contains iron, including the steps of:
   (a) filtering the waste;
   (b) adding a basic material to the filtrate produced by step (a) to raise its pH to about 11, causing a precipitate containing iron, vanadium, and nickel to form;
   (c) dissolving the iron-vanadium-nickel precipitate in acid to form an acidic solution having a pH less than about 3;
   (d) adding a basic material to the solution to raise its pH to about 3, causing a first iron-rich precipitate to form;
   (e) separating out the first iron-rich precipitate from the remaining liquid;
   (f) adding a basic material to the remaining liquid from step (e) to raise its pH to about 6, causing a first vanadium-rich precipitate to form;
   (g) separating out the first vanadium-rich precipitate from the remaining liquid; and
   (h) adding a basic material to the remaining liquid from step (g) to raise its pH to about 10, causing a first nickel-rich precipitate to form; and
   (i) separating out the first nickel-rich precipitate from the remaining liquid.

3. The process of claim 2, including the additional steps of:
   (j) dissolving the first nickel-rich precipitate from step (i) in acid to form an acidic solution;
   (k) adding an oxidizing agent to the solution;
   (l) adding a basic material to the solution to raise its pH to about 3 to 4, causing a second iron-rich precipitate to form;
   (m) separating out the second iron-rich precipitate from the remaining liquid;
   (n) adding a basic material to the remaining liquid from step (m) to raise its pH to about 10, causing a second nickel-rich precipitate to form.

4. The process of claim 3, including the additional steps of:
   (o) dissolving the first vanadium-rich precipitate in acid to form an acidic solution;
   (p) adding a basic material to the solution to raise its pH to about 6, causing a second vanadium-rich precipitate to form;
   (q) separating out the second vanadium-rich precipitate from the remaining liquid;
   (r) dissolving the second vanadium-rich precipitate in acid to form an acidic solution;
   (s) adding a basic material to the solution to raise its pH to about 6, causing a third vanadium-rich precipitate to form;
   (t) separating out the third vanadium-rich precipitate from the remaining liquid; and
   (u) combining the remaining liquids from steps (q) and (t) and mixing them with the solution produced in step (j).

5. The process of claim 2, where the nickel and vanadium-rich precipitates are further purified by separately dissolving them in acid and then adding basic materials to cause reprecipitation.

6. A process for recovering nickel and vanadium from waste which also contains iron, including the steps of:
   (a) adding an oxidizing agent to the waste to adjust the pH of the waste to about 0.5 to 3.0, thereby substantially solubilizing the nickel and vanadium;
   (b) raising the pH of the waste to about 4.0 to 5.0, causing an iron-rich precipitate to form;
   (c) separating out the iron-rich precipitate from the waste;
   (d) raising the pH of the remaining waste to about 8.0 to 10.0, causing a nickel-rich precipitate to form;
   (e) separating out the nickel-rich precipitate from the waste; and
   (f) recovering vanadium from the remaining waste.

7. The process of claim 6, wherein the precipitates are purified by being redissolved in acidic solutions and then reprecipitated by the addition of a basic material to each solution to raise its pH to approximately the same level at which the corresponding original precipitation occurred.

8. The process of claim 6, where the pH is lowered to about 1.5 in step (a), and is raised to about 4.5 in step (b) and to about 9.5 in step (d).

9. The process of claim 8, where the precipitates are purified by being redissolved in acidic solutions and then reprecipitated by the addition of a basic material to each solution to raise its pH to approximately the same level at which the corresponding original precipitation occurred.

10. A process for recovering nickel and vanadium from waste which also contains iron and which is partially solid and partially liquid, including the steps of:
   (a) separately adding an oxidizing agent to both the liquid waste and the solid waste, in order to oxidize vanadium present in the waste to its +5 valence state;
   (b) filtering the oxidized solid waste, and combining the filtrate with the oxidized liquid waste to form a combined liquid;
   (c) raising the pH of the combined liquid to about 4.5, causing an iron-rich precipitate to form;
   (d) separating out the iron-rich precipitate from the liquid;
   (e) raising the pH of the remaining liquid to about 9.5, causing a nickel-rich precipitate to form;
   (f) separating out the nickel-rich precipitate from the liquid; and
   (g) recovering vanadium from the remaining liquid.

* * * * *